Patented Oct. 8, 1929

1,730,388

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

PROCESS FOR THE MANUFACTURE OF A SUBSTITUTED GUANIDINE

No Drawing. Original application filed April 8, 1927, Serial No. 182,187. Divided and this application filed January 14, 1928. Serial No. 246,920.

The present invention relates to the manufacture and production of a new valuable product being chemically the p-di-methyl-amino-di-phenyl-guanidine having the following formula:

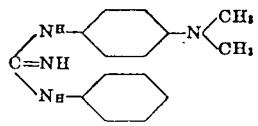

which product is an accelerator of the rubber vulcanization process.

This compound was prepared by reacting phenyl mustard oil with p-amino di-methyl-aniline to produce a thiourea and then desulphurizing the thiourea so formed.

The thiourea was preferably prepared by reacting 135 parts (1 molecular proportion) of phenyl mustard oil with approximately 136 parts by weight (1 molecular proportion) of p-amino-di-methyl aniline. The reaction that takes place is most conveniently represented as follows:

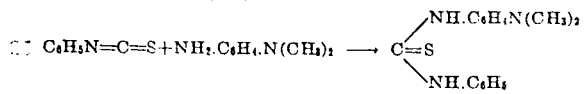

The thiourea so obtained was then desulphurized by treatment with a lead compound while warming under pressure in the presence of ammonia. Preferably the ammonia was used in the form of an alcoholic solution thereof. The heating of the mass was continued for a period of time necessary to produce substantially complete combination of the substances whereupon the mixture was allowed to cool, any excess of pressure was released, and the reaction product was filtered. The residue was then washed with a diluted acid such as hydrochloric acid to dissolve any guanidine derivative from unchanged thiourea which may remain in the product. The acid solution was then rendered slightly alkaline by the addition thereto of a suitable alkali, such as caustic soda and the precipitated guanidine derivative was then filtered and washed and combined with the product obtained from the alcoholic liquor. The product can be further purified, if necessary, by redissolving it again in an acid and precipitating as before with caustic. The resulting product, p-di-methyl-amino-di-phenyl-guanidine, as previously stated, has a composition represented by the following formula:

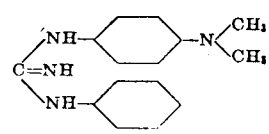

Having described this example of the invention, I do not wish to be understood as being limited to the exact proportions, ingredients, temperatures and steps set forth, for various changes may be made without departing from the essential features of my invention. The invention is limited solely by the claims attached hereto as a part of this specification wherein it is intended to claim the invention as broadly as possible.

This case is a division of application Serial No. 182,187, filed April 8, 1927, by the present applicant.

What is claimed is:

1. The process of making p-di-methyl-amino-di-phenyl-guanidine which comprises reacting phenyl mustard oil with p-amino di-methyl-aniline to produce a thiourea and then desulphurizing the thiourea so formed.

2. The process of making p-di-methyl-amino-di-phenyl-guanidine which comprises reacting phenyl mustard oil with p-amino di-methyl-aniline to produce a thiourea and desulphurizing the thiourea so formed by treatment with a lead compound while warming under pressure in the presence of ammonia.

3. The process of making p-di-methyl-amino-di-phenyl-guanidine which comprises reacting phenyl mustard oil with p-amino di-methyl-aniline to produce a thiourea and desulphurizing the thiourea so formed by treatment with a lead compound while warming under pressure in the presence of an alcoholic solution of ammonia.

4. The process of making p-di-methyl-amino-di-phenyl-guanidine which comprises reacting substantially equi-molecular proportions of phenyl mustard oil and p-amino-di-methyl-aniline to produce p-di-methyl-amino-di-phenyl thiourea, and then desulphurizing the thiourea so formed by treatment with a lead compound while warming under pressure in the presence of an alcoholic solution of ammonia, and isolating the p-di-methyl-amino-di-phenyl-guanidine thus formed.

5. As a new article of manufacture a disubstituted guanidine having the empirical formula $C_{15}H_{18}N_4$, said guanidine containing a phenyl and a dimethyl-anilino grouping.

6. As a new article of manufacture, p-dimethyl-amino-di-phenyl-guanidine, having the formula

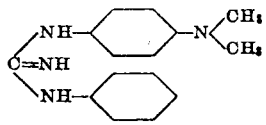

said product being obtainable by reacting phenyl mustard oil with p-amino-di-methyl-aniline to produce a thiourea and then desulphurizing the thiourea so formed in the presence of ammonia.

In testimony whereof I hereunto affix my signature.

WINFIELD SCOTT.